No. 849,514. PATENTED APR. 9, 1907.
H. TABOR & W. LEWIS.
EQUALIZING SUPPORT FOR MOLDERS' FLASKS.
APPLICATION FILED OCT. 25, 1906.
2 SHEETS—SHEET 2.
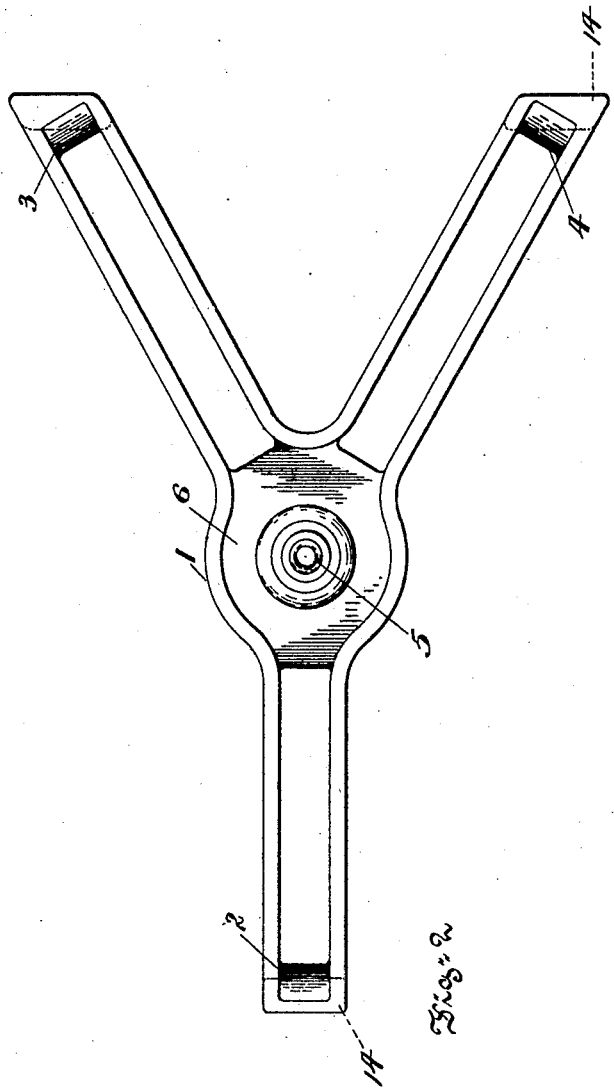

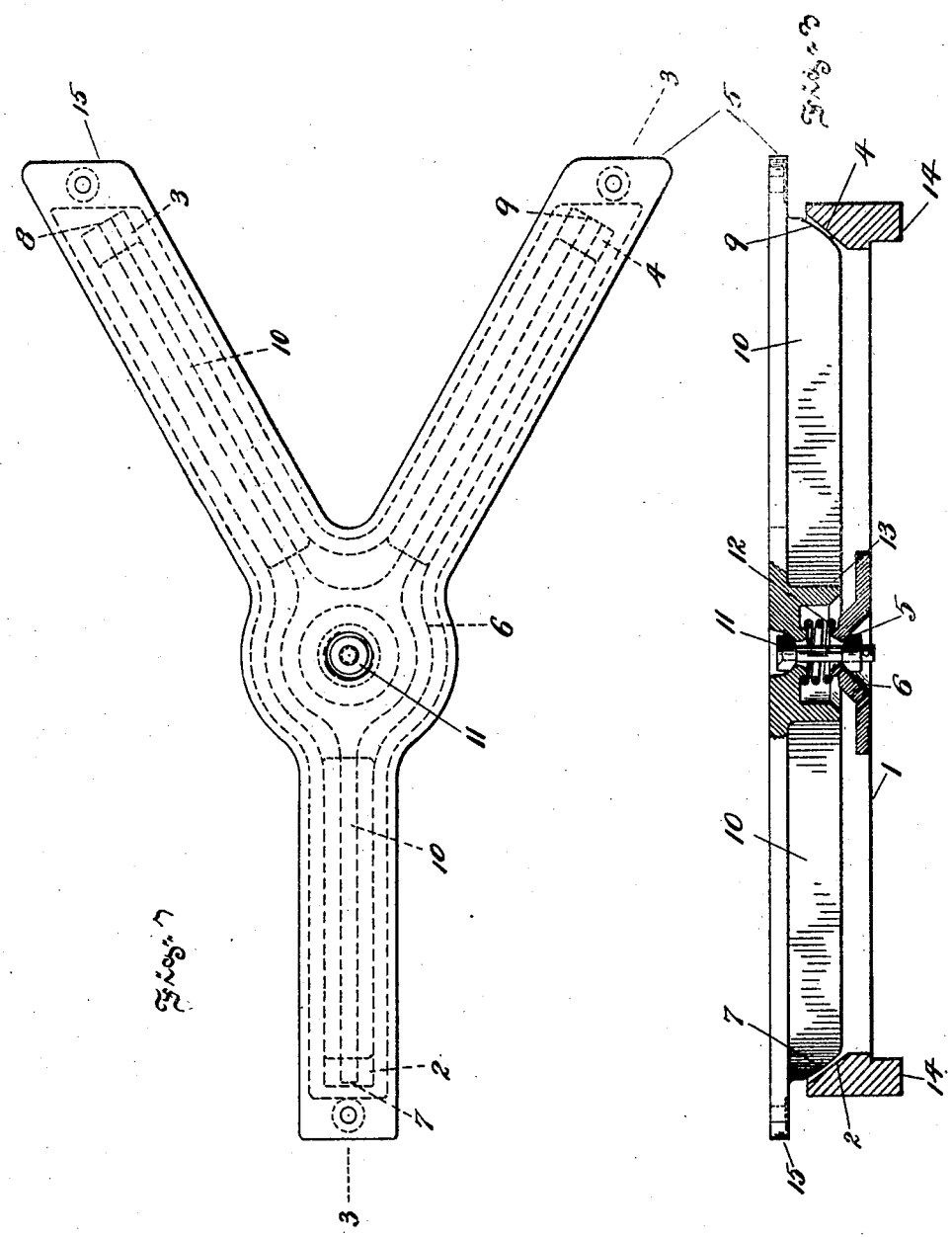

UNITED STATES PATENT OFFICE.

HARRIS TABOR, OF ELIZABETH, NEW JERSEY, AND WILFRED LEWIS, OF PHILADELPHIA, PENNSYLVANIA, ASSIGNORS TO THE TABOR MANUFACTURING COMPANY, OF PHILADELPHIA, PENNSYLVANIA, A CORPORATION OF NEW JERSEY.

EQUALIZING-SUPPORT FOR MOLDERS' FLASKS.

No. 849,514.      Specification of Letters Patent.      Patented April 9, 1907.

Application filed October 25, 1906. Serial No. 340,433.

*To all whom it may concern:*

Be it known that we, HARRIS TABOR and WILFRED LEWIS, both citizens of the United States, residing at Elizabeth, New Jersey, and Philadelphia, Pennsylvania, respectively, have invented a new and useful Equalizing-Support for Molders' Flasks, of which the following is a specification.

The principal object of the present invention is to provide a simple, efficient, and reliable equalizing-cradle for supporting flasks in such a way that they will be held in proper position, even though they are out of shape or warped or twisted.

To this and other ends hereinafter set forth the invention comprises the improvements to be presently described and finally claimed.

The nature, characteristic features, and scope of our invention will be more fully understood from the following description, taken in connection with the accompanying drawings, forming part hereof, and in which—

Figure 1 is a top or plan view of an equalizing-cradle embodying features of the invention. Fig. 2 is a top or plan view of the lower member of the device, and Fig. 3 is a sectional view taken on the line 3 3 of Fig. 1.

In the drawings the lower part of the device 1 comprises a spider having a three-point bearing, the points being indicated at 2, 3, and 4. This spider comprises three legs, each of which is slotted longitudinally throughout its length and which extend from a centrally-arranged bearing 5, formed through a plate 6. The upper part of the device comprises a similar spider having three-point bearings (indicated at 7, 8, and 9) and which coöperate with the three-point bearings 2, 3, and 4. One set of three-point bearings, in the present instance those marked 7, 8, and 9, are struck from a common center and are themselves circular or perhaps more properly spherical in the sense that they are parts of figures of such configurations. The upper part or spider is shown to consist of three arms each having a web 10, which is arranged in the slot of the corresponding arm of the lower spider, and the bearing-surfaces or bearings 7, 8, and 9 are illustrated as formed at the ends of these webs. The webs, since they are arranged in the slots, limit the rotary motion of the two spiders.

11 is a pivot by means of which the two spiders are connected, and it is shown as having hemispherical heads fitted to corresponding bearings. Encircling the pivot and between the spiders there is a spiral spring 12.

13 is a ring-like flange extending between the webs of the arms of the upper spider, and it constitutes a dust-guard or housing.

14 are downward projections on the arms of the lower spider, and they may be used to engage the rails or other parts of a molding-machine or simply as feet. The ends 15 of the arms of the upper spider are shown to extend beyond the webs and to be provided with bolt-holes, which may be employed, if desired, for connecting a suitable piece or member on top of the upper spider.

In use the spider is placed upon the frame, table, or support which is to receive and hold it while a pattern is drawn from it. Ordinarily the spring 12 holds the two spiders in such position that the bearings are not in contact, so that as the flask approaches its support it touches the upper surface of the top spider, and since the latter is supported by the spring it adjusts itself to inequalities in the flask. The continued descent of the flask overpowers the spring (which normally balances the weight of the upper spider) so that the three-point bearing-surfaces come into contact with each other, thus supporting the weight of the flask, and the bearing-surfaces possess so much friction that while supporting the weight of the flask the upper spider is practically immovable.

It may be remarked that the flasks and pattern-carrying boards are clamped together and are supported by some provisions of a machine in horizontal position when they are lowered onto the described support, so that the relative positions of the flask and pattern-carrying board are fixed independent of the action of the described support, and this fixed relation must be maintained after the pattern-carrying board and flask are unclamped in order that when the pattern is drawn the mold may not be spoiled. The described support receives the flask, and since the support is yielding the support adapts itself to any irregularity in the bottom of the flask. Therefore the relative positions of the pattern and flask are maintained after the unclamping and during the drawing of the pattern. An example of means for presenting the flask to the support is the flask-carrier shown in Letters Patent No. 824,317 to Harris Tabor.

What we claim as new, and desire to secure by Letters Patent, is—

1. An equalizing-support for molders' flasks comprising a pair of superposed spiders having three-point bearings between them of which bearings one set are struck from a common center, a pivot centrally connecting said spiders and affording them motion toward and away from each other, and a spring interposed between the spiders, substantially as described.

2. An equalizing-support for molders' flasks comprising a pair of spiders having slot-and-web connection with each other and having bearing-surfaces, a pivot for connecting said spiders and affording them a motion toward and away from each other, and a spring interposed between the spiders, substantially as described.

3. An equalizing-support for molders' flasks comprising a pair of superposed spiders having three-point bearings, means for connecting said spiders to afford them a limited range of universal motion, and a spring for normally holding the spiders in position with their bearings out of contact, substantially as described.

4. An equalizing-support for molders' flasks comprising a pair of superposed members each having part of a ball-joint, means for connecting said members to afford them a limited range of universal motion, and means for normally holding the members in position with the parts of the ball-joint out of contact, substantially as described.

5. An equalizing-support for molders' flasks comprising a pair of superposed members each having part of a ball-joint, and means for normally holding the members in position with the parts of the ball-joint out of contact, substantially as described.

In testimony whereof we have hereunto signed our names.

HARRIS TABOR.
WILFRED LEWIS.

In presence of—
W. J. JACKSON,
K. M. GILLIGAN.